United States Patent
Huang

(10) Patent No.: US 11,052,997 B2
(45) Date of Patent: Jul. 6, 2021

(54) DUAL-ROTOR WING MOTOR

(71) Applicant: Peng Yu Huang, Yilan County (TW)

(72) Inventor: Peng Yu Huang, Yilan County (TW)

(*) Notice: Subject to any disclaimer, the term of this patent is extended or adjusted under 35 U.S.C. 154(b) by 447 days.

(21) Appl. No.: 16/229,167

(22) Filed: Dec. 21, 2018

(65) Prior Publication Data

US 2020/0198780 A1 Jun. 25, 2020

(51) Int. Cl.
*H02K 5/16* (2006.01)
*H02K 7/08* (2006.01)
*B64C 27/10* (2006.01)
*B64C 39/02* (2006.01)

(52) U.S. Cl.
CPC ............ *B64C 27/10* (2013.01); *B64C 39/024* (2013.01); *H02K 5/16* (2013.01); *H02K 7/08* (2013.01); *B64C 2201/024* (2013.01); *B64C 2201/027* (2013.01); *B64C 2201/042* (2013.01); *B64C 2201/108* (2013.01); *B64C 2201/165* (2013.01)

(58) Field of Classification Search
CPC . B64C 27/10; B64C 39/024; B64C 2201/024; B64C 2201/165; B64C 2201/108; B64C 2201/042; B64C 2201/027; H02K 5/16; H02K 7/08
See application file for complete search history.

(56) References Cited

U.S. PATENT DOCUMENTS

| | | | |
|---|---|---|---|
| 9,184,649 B2* | 11/2015 | Webster | H02K 51/00 |
| 2013/0181562 A1* | 7/2013 | Gieras | H02K 16/02 |
| | | | 310/114 |
| 2016/0211720 A1* | 7/2016 | Koegler | F16C 1/00 |
| 2018/0044029 A1* | 2/2018 | Koegler | H02K 7/14 |
| 2019/0009894 A1* | 1/2019 | Cai | B64C 17/02 |

* cited by examiner

*Primary Examiner* — Tulsidas C Patel
(74) *Attorney, Agent, or Firm* — Lin & Associates Intellectual Property, Inc.

(57) ABSTRACT

A dual-rotor wing motor includes a sleeve separating an inner shaft from an outer shaft. An external bearing is independently coupled to a shaft cover while an internal bearing is independently coupled to the inner shaft, and thus the external bearing and the internal bearing independently bear a friction force due to the rotation of the respective single shaft, the heat generated by the friction force can be reduced and the lubricant cannot be easily evaporated. Accordingly, the service life of the dual-rotor wing motor of the present invention can be prolonged.

4 Claims, 8 Drawing Sheets

DUAL-ROTOR WING MOTOR

BACKGROUND OF THE INVENTION

1. Field of the Invention

The present invention relates generally to a motor, in particular to a dual-rotor wing motor, which uses battery as a power for driving flying objects, such as remote control aircrafts, drones, and aerial camera helicopters, and provides a best and most compact structure of the dual-rotor wing motor so as to perform a very elegant way of flying.

2. The Prior Arts

Drones are prevalent nowadays. The applications of the drones become wider with each passing day, such as agricultural spraying, aerial photography, delivery of parcels and mails, aerial survey and search, and fire fighting. To achieve these purposes, the drones need to have a vertical lifting capacity. In an overlapping dual-rotor helicopter, two rotors rotate in opposite directions to provide an anti-torque so as to stably balance the helicopter, and thus an overall structure thereof is rather complicated.

However, in the course of designing the present invention, some similar products have been developed and are on sale in the markets. Unfortunately, these products still have some systemic shortcomings. To be more specific, FIG. 1 shows a conventional dual-rotor wing motor unit which has a simple structure, but has a few shortcomings. The inner and outer shafts of the motor unit need to be rotated in opposite directions relative to each other such that the bearing unit must burden twice times of the friction forces of the shafts, thereby leading to ultimate ruin of the bearing unit. Also, if the bearing unit is too small in size, it cannot sufficiently withstand the load of the two shafts.

SUMMARY OF THE INVENTION

A primary objective of the present invention is to provide a dual-rotor wing motor, in which a sleeve is provided to separate an inner shaft and an outer shaft. An external bearing is independently coupled to a shaft cover while an internal bearing is independently coupled to the inner shaft, and thus the external bearing and the internal bearing independently bear a friction force due to the rotation of the respective single shaft, the heat generated by the friction force can be reduced and the lubricant cannot be easily evaporated. Accordingly, the service life of the dual-rotor wing motor of the present invention can be prolonged.

In order to achieve the above objective, a dual-rotor wing motor according to the present invention includes: a lower motor unit having an inner shaft; an upper motor unit having a hollow outer shaft, the hollow outer shaft axially connected to a shaft cover which defines a bearing cavity therein, the inner shaft coaxially extending through the hollow outer shaft; and a mounting base installed between the lower and upper motor units.

The dual-rotor wing motor of the present invention further comprises: a sleeve disposed in an interior of the lower and upper motor units and fixed on the mounting base in such a manner that one end of the sleeve extends into the bearing cavity while the inner shaft coaxially extends through the sleeve; and at least one external bearing disposed between an outer wall of the sleeve and an inner wall of the bearing cavity.

Preferably, the outer shaft and the shaft cover are integrally formed as one-piece member.

Preferably, the upper motor unit further includes a rotor cover and a support flange extending inwardly and radially from an inner wall of the rotor cover to permit seating of the at least one external bearing thereon.

Preferably, the dual-rotor wing motor of the present invention includes two of the external bearings, a small-diameter tubular portion disposed around the outer wall of the sleeve, and a large-diameter tubular portion disposed to abut against the inner wall of the bearing cavity.

The advantages provided by the present invention are that the sleeve separates the inner shaft from the outer shaft such that the external bearing is independently coupled to the shaft cover while the internal bearing is independently coupled to the inner shaft, and thus the external bearing and the internal bearing independently bear a friction force due to the rotation of the respective single shaft, the heat generated by the friction force can be reduced and the lubricant cannot be easily evaporated. Accordingly, the service life of the dual-rotor wing motor of the present invention can be prolonged.

BRIEF DESCRIPTION OF THE DRAWINGS

In combination with a brief description of the drawings, it will be easier to understand these characteristics and advantages of the present invention by referring to the detailed description below, in which.

DETAILED DESCRIPTION OF THE PREFERRED EMBODIMENT

Figure 1:
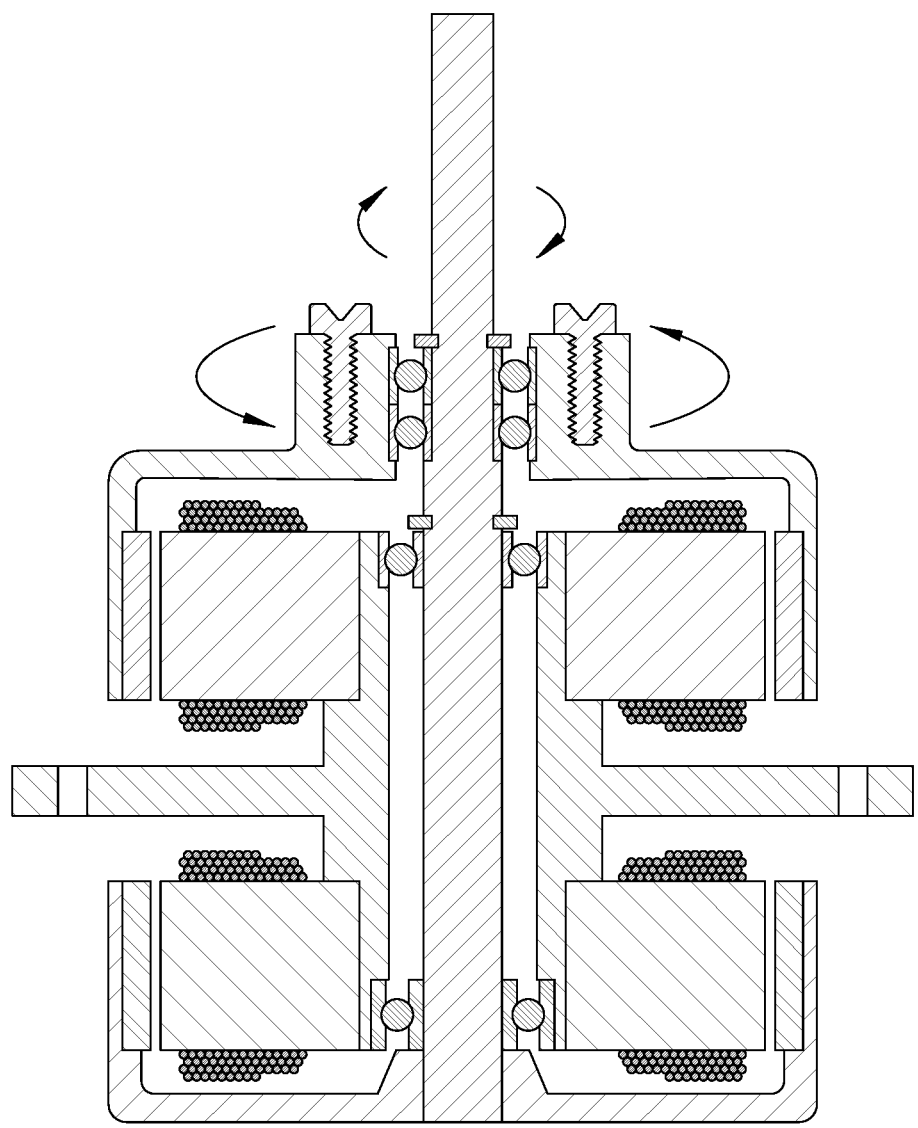
FIG. 1 is a cross sectional view of a conventional dual-rotor wing motor unit.
Figure 2:
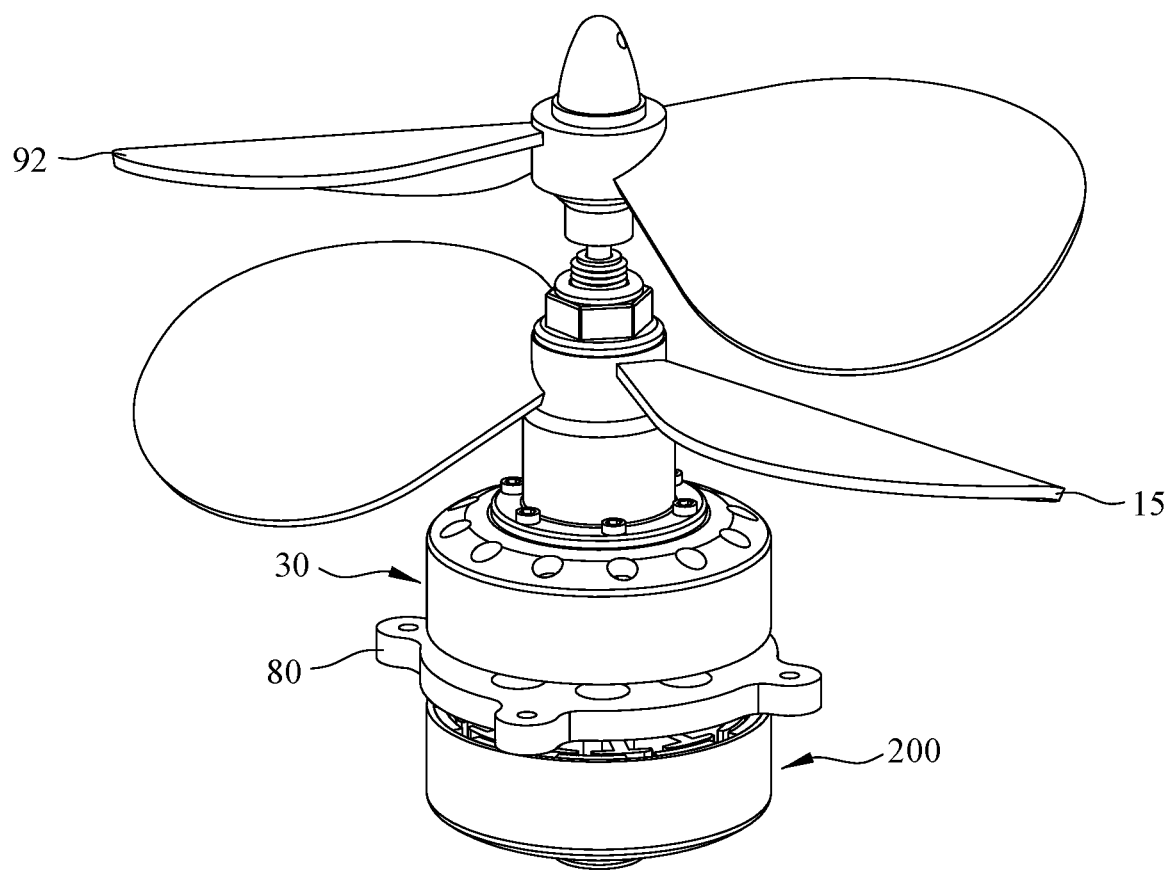
FIG. 2 is a perspective view of a dual-rotor wing motor of the present invention, illustrating how wings are installed thereon.

Referring to FIG. 2, the present invention provides a dual-rotor wing motor, particularly a motor device for use on a remotely controlled aircraft and a drone. The present invention is in conjunction with the prior art of a brushless motor, and thus, for the sake of clarity, the description of the magneto-electric related technology will be omitted, so that the following detailed description can be better understood. The description is only within the scope of the present invention and claims. There is no intention to limit the prior art technology outside the present invention. Referring to the Figures, like element numerals indicate like or corresponding parts throughout several views.

Referring to FIGS. 3 to 8, a dual-rotor wing motor according to the present invention includes a lower motor unit having an inner shaft 90; an upper motor unit having a hollow outer shaft 11, the hollow outer shaft 11 axially connected to a shaft cover 10 which defines a bearing cavity 12 therein, the inner shaft 90 extending coaxially through the hollow outer shaft 11; and a mounting base 80 installed between the lower and upper motor units.

The dual-rotor wing motor of the present invention is characterized in that a sleeve 40 is disposed in an interior of the lower and upper motor units and further is fixed on the mounting base 80 in such a manner that one end of the sleeve 40 extends into the bearing cavity 12 while the inner shaft 90 extends coaxially through the sleeve 40; and at least one external bearing 20 is disposed between an outer wall 42 of the sleeve 40 and an inner wall of the bearing cavity 12.

Figure 3:
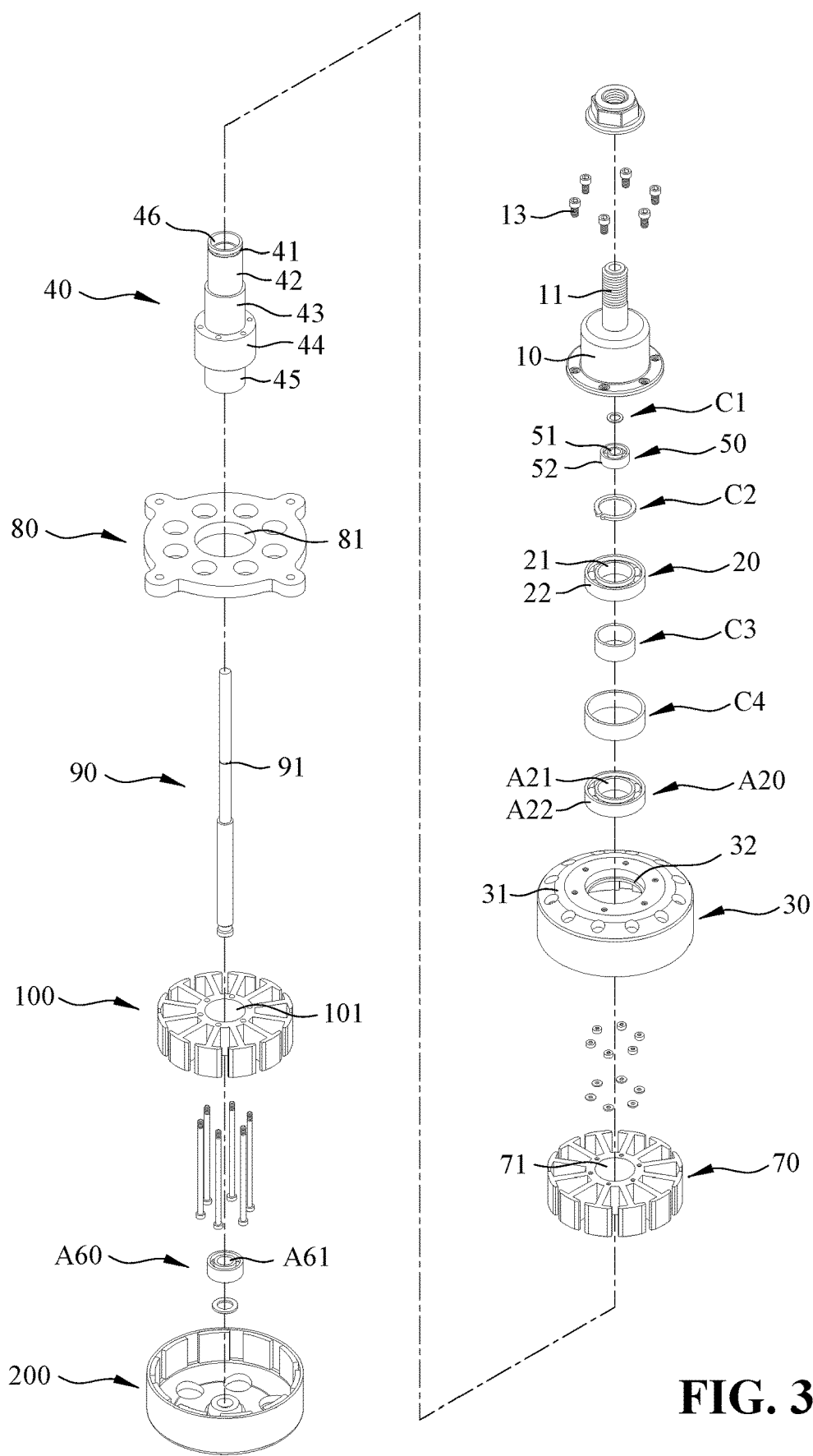
FIG. 3 shows an exploded view of the dual-rotor wing motor of the present invention.
Figure 4:
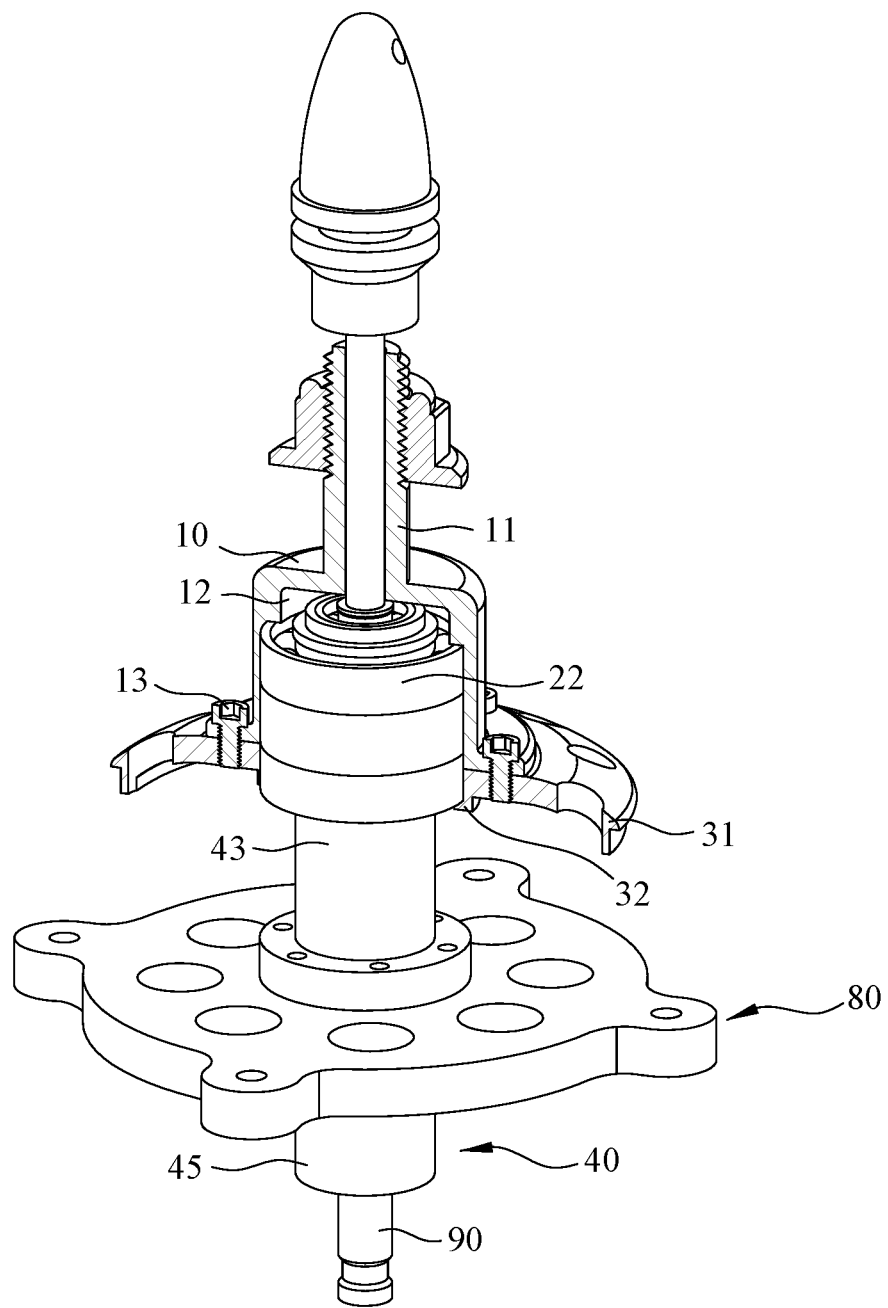
FIG. 4 shows a fragmentary cross sectional view of the dual-rotor wing motor of the present invention, illustrating the improved parts thereof.
Figure 5:
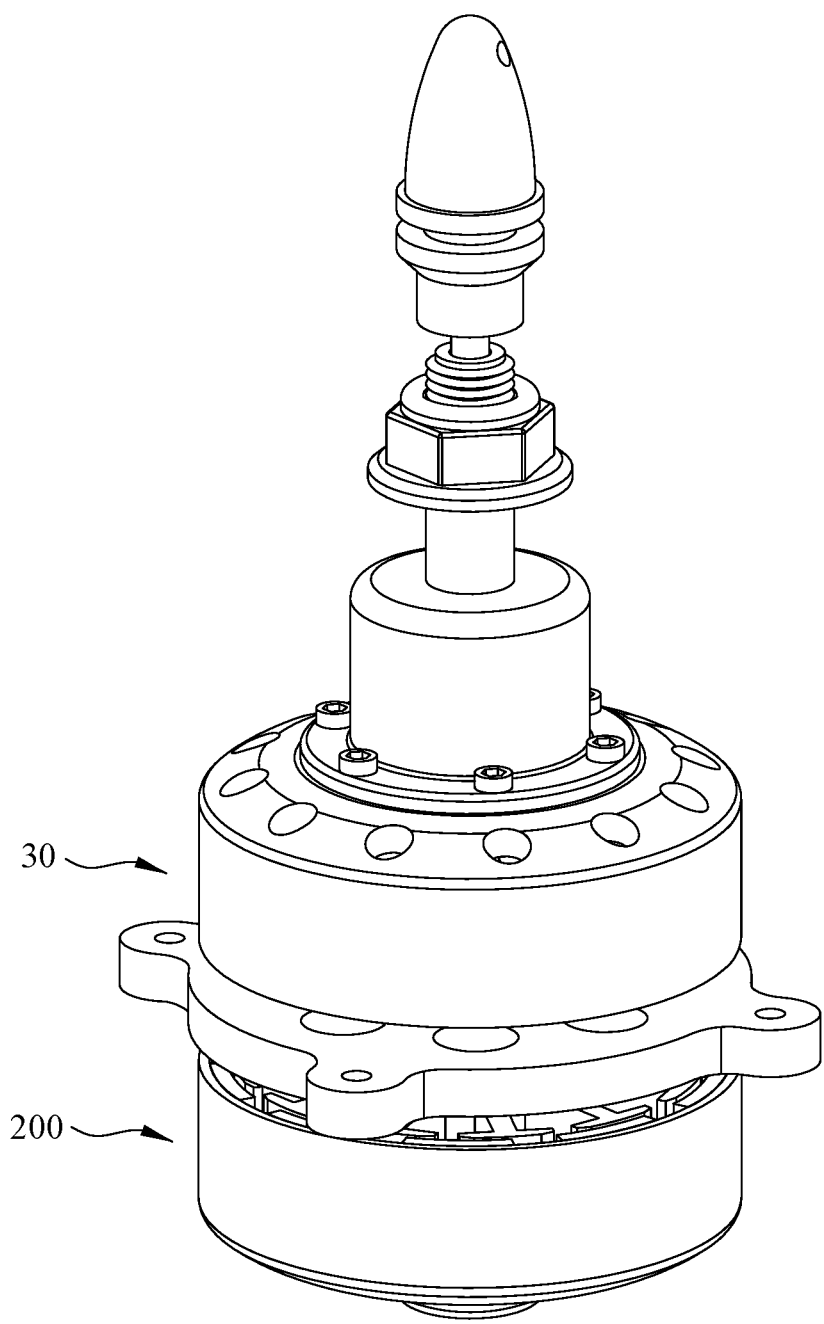
FIG. 5 is a perspective view of the dual-rotor wing motor of the present invention
Figure 6:
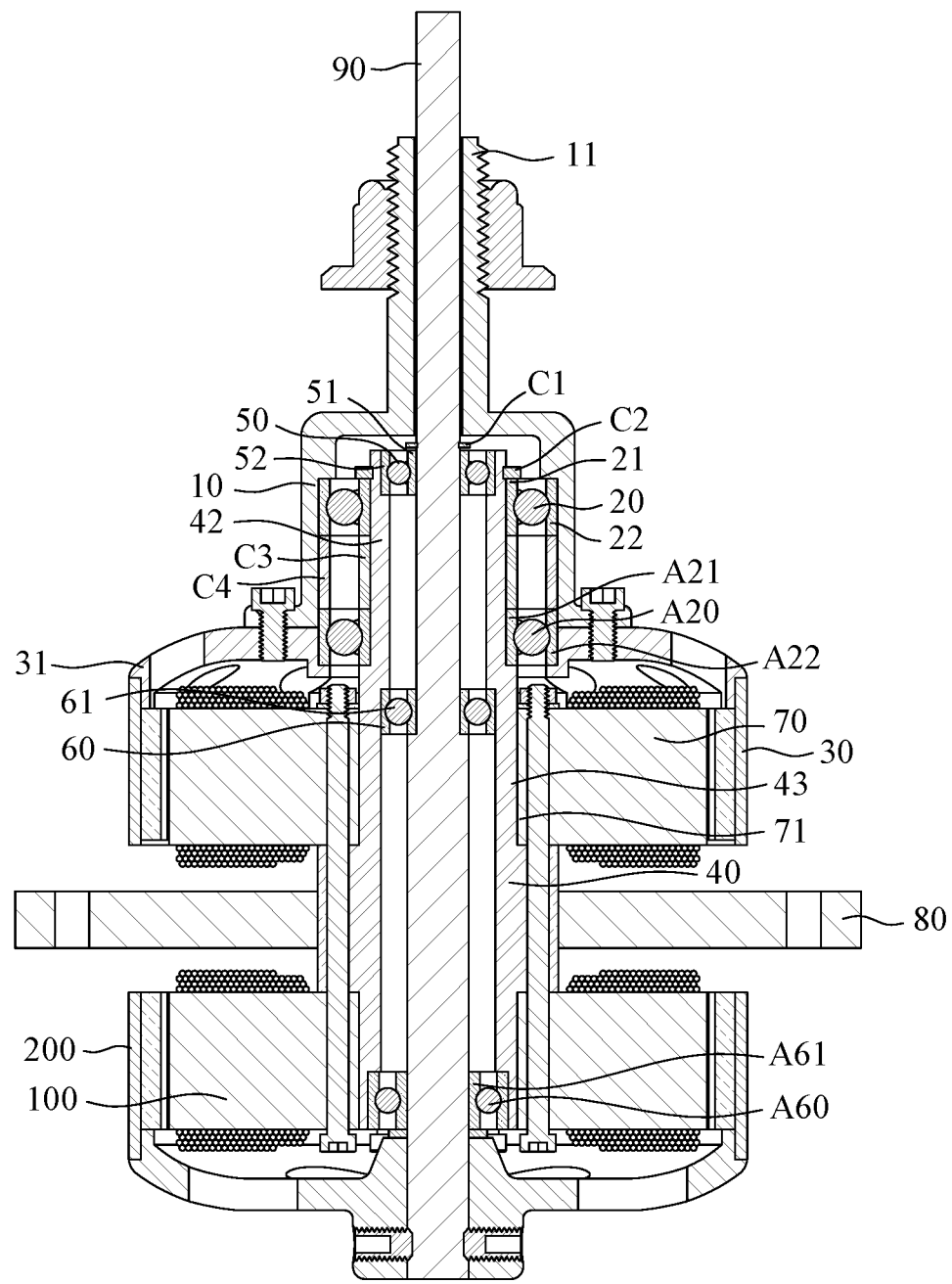
FIG. 6 is a planar cross sectional view of the dual-rotor wing motor of the present invention.
Figure 7:
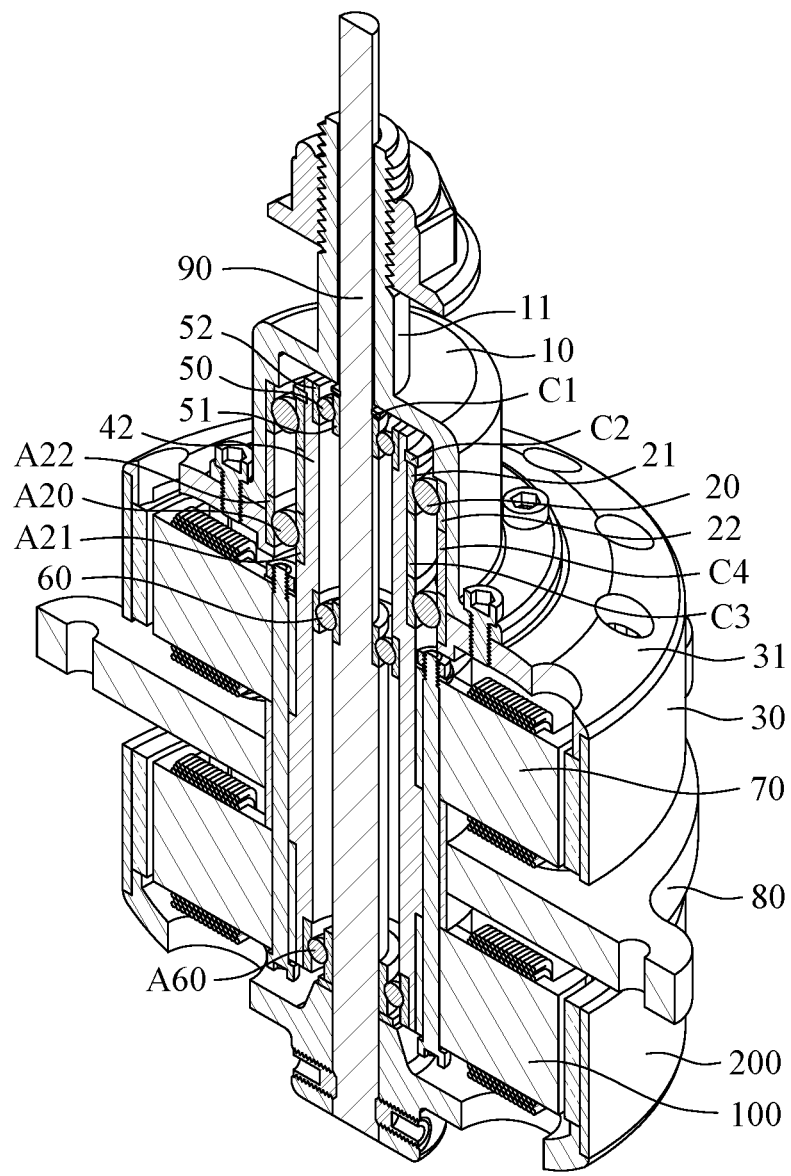
FIG. 7 is a perspective cross sectional view of the dual-rotor wing motor of the present invention.

Referring to FIGS. 3, 4 and 5, in one embodiment of the present invention, the upper motor unit includes a second rotor 30, a second stator 70 and a rotor cover 31. The second stator 70 is sleeved around an outer wall 43 of the sleeve 40 and is further securely fixed on a top end of the mounting base 80. The second rotor 30 is sleeved around an outer wall of the second stator 70 while the rotor cover 31 is seated on a top end of the second rotor 30. The shaft cover 10 is disposed on the top end of the rotor cover 31 such that an end of the outer shaft 11 protrudes outwardly and axially from the shaft cover 10. The shaft cover 10 and the rotor cover 31 are assembled together and seated fixedly on the outer rings 22, A22 of the external bearings 20, 22A. At this time, the inner rings 21, A21 of the two external bearings 20, A20 are sleeved around the outer wall 42 of the sleeve 40, and a large-diameter C-shaped retention ring C2 is sleeved around an annular groove 41 of the sleeve 40. Three internal bearings 50, 60, A60 are disposed on the inner wall of the sleeve 40 at different positions. The lower motor unit includes a first rotor 200 and a first stator 100 sleeved around an outer wall 45 of the sleeve 40 and further securely fixed on a bottom side of the mounting base 80 while the first rotor 200 is sleeved around the first stator 100. The inner shaft 90 axially extends through the first rotor 200. The three internal bearings 50, 60, A60 are disposed between an inner wall 46 of the sleeve 40 and the inner shaft 90. The inner shaft 90 coaxially extends through the inner rings 51, 61, A61 of the three internal bearings 50, 60, A60 and the outer shaft 11 while a small-diameter C-shaped retention ring C1 is sleeved around an annular groove 91 of the inner shaft 90.

As shown in FIG. 2, a clockwise rotation wing 92 and a counterclockwise rotation wing 15 are securely mounted on the inner shaft 90 and the outer shaft 11, respectively.

To be more specific, the mounting base 80 has a central inner wall 81 for securing an outer wall 44 of the sleeve 40 thereon while a central inner wall 71 of the second stator 70 can be securely mounted on the outer wall 43 of the sleeve 40, and a small-diameter tubular portion C3 is disposed around the outer wall 42 of the sleeve 40 and a large-diameter tubular portion C4 is disposed to abut against the inner wall of the bearing cavity 12.

In one embodiment of the present invention, the outer shaft 11 and the shaft cover 10 are integrally formed as one-piece member.

Preferably, a support flange 32 extends inwardly and radially from an inner wall of the rotor cover 31 to permit seating of the external bearing A20 thereon. The shaft cover 10 is sleeved around the outer rings 22, A22 of the external bearings 20, A20, and abuts against the rotor cover 31. Then, several fastener screws 13 are used for securing the shaft cover 10 to the rotor cover 31, and an inner wall 101 of the first stator 100 is securely fastened to the outer wall 45 of the sleeve 40.

In one embodiment of the present invention, the two external bearings 20, A20, the small-diameter tubular portion C3 and the large-diameter tubular portion C4 can be coupled together and thus can be substituted by an elongated bearing (not shown), which can retain the second rotor 30 stable, thereby preventing wobbling of the second rotor 30.

As described above, the advantages provided by the present invention are that the sleeve 40 separates the inner shaft 90 from the outer shaft 11 such that the two external bearings 20, A20 are independently coupled to the shaft cover 10 while three internal bearings 50, 60, A60 are independently coupled to the inner shaft 90, and thus the two external bearings 20, A20 and the three internal bearings 50, 60, A60 independently bear the friction force due to the rotation of the respective single shaft, the heat generated by the friction force can be reduced and the lubricant cannot be easily evaporated. Accordingly, the service life of the dual-rotor wing motor of the present invention can be prolonged.

Figure 8:
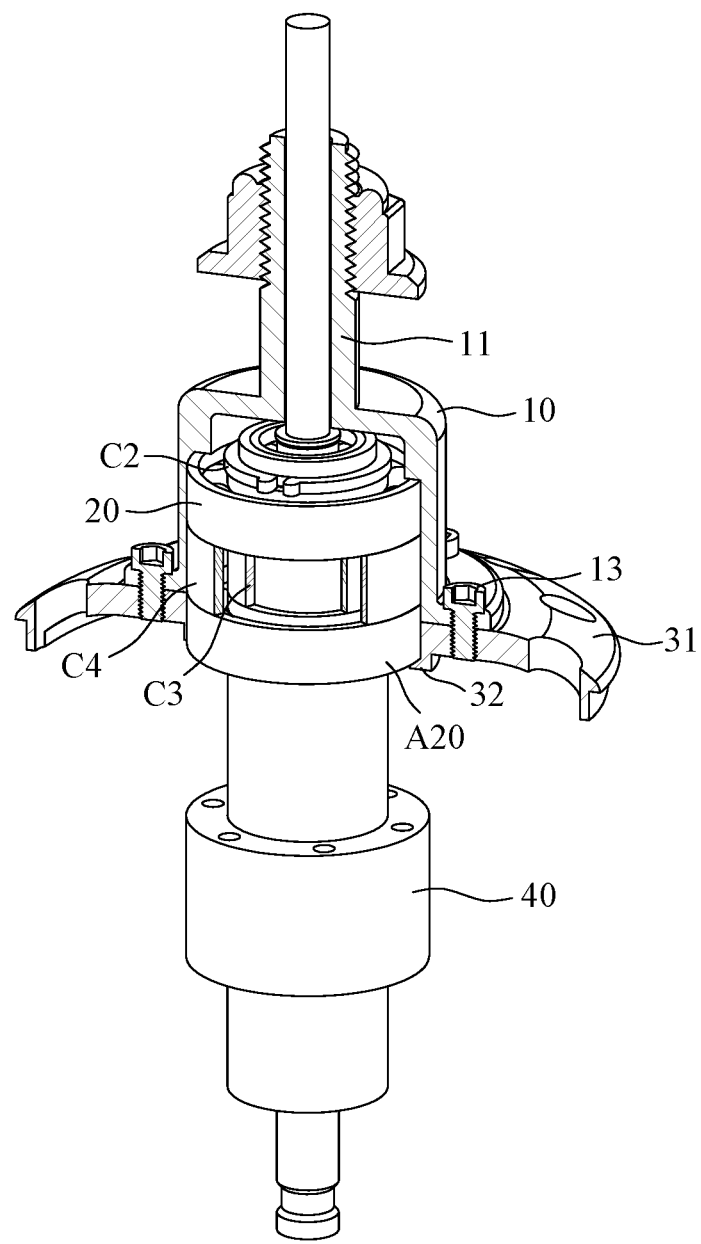
FIG. 8 shows a fragmentary cross sectional view of the dual-rotor wing motor of the present invention, illustrating the improved parts thereof.

FIG. 8 shows a fragmentary exploded view of the dual-rotor wing motor of the present invention, illustrating the improved parts thereof, which are defined in the claims of the present application. The feature of the dual-rotor wing motor of the present invention is to provide an arrangement of the sleeve and the external bearings, which is in conjunction with the brushless motor. There is no intention to limit the prior art technology outside the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A dual-rotor wing motor comprising a lower motor unit having an inner shaft; an upper motor unit having a hollow outer shaft, the hollow outer shaft axially connected to a shaft cover which defines a bearing cavity therein, the inner shaft coaxially extending through the hollow outer shaft; and a mounting base installed between the lower and upper motor units, wherein the dual-rotor wing motor further comprises:
   a sleeve disposed in an interior of the lower and upper motor units and fixed on the mounting base in such a manner that one end of said sleeve extends into the bearing cavity while the inner shaft coaxially extends through said sleeve; and
   at least one external bearing disposed between an outer wall of said sleeve and an inner wall of the bearing cavity.

2. The dual-rotor wing motor according to claim 1, wherein the outer shaft and the shaft cover are integrally formed as one-piece member.

3. The dual-rotor wing motor according to claim 1, wherein the upper motor unit further comprises a rotor cover and a support flange extending inwardly and radially from an inner wall of the rotor cover to permit seating of said at least one external bearing thereon.

4. The dual-rotor wing motor according to claim 1, comprising two of said external bearings, wherein the dual-rotor wing motor further comprises a small-diameter tubular portion disposed around said outer wall of said sleeve and a large-diameter tubular portion disposed to abut against the inner wall of the bearing cavity.

* * * * *